July 24, 1923.                                                     1,463,040
                              E. R. FITCH
                      DOOR AND BRAKE CONTROL DEVICE
                         Filed June 29, 1921
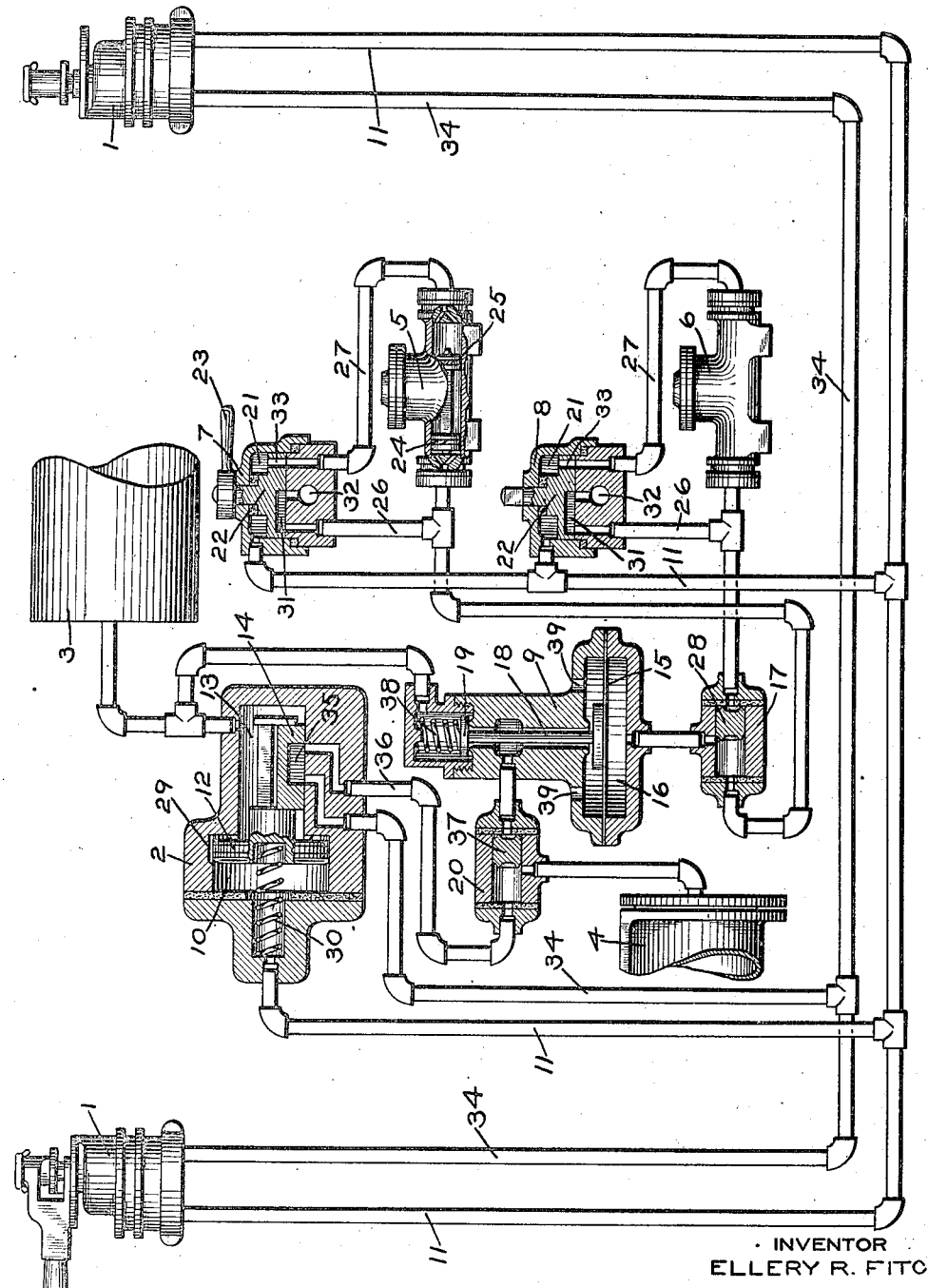
INVENTOR
ELLERY R. FITCH
BY *Wm. M. Cady*
ATTORNEY Patented July 24, 1923.

1,463,040

UNITED STATES PATENT OFFICE.

ELLERY R. FITCH, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

DOOR AND BRAKE CONTROL DEVICE.

Application filed June 29, 1921. Serial No. 481,251.

*To all whom it may concern:*

Be it known that I, ELLERY R. FITCH, a citizen of the United States, residing at St. Louis, and State of Missouri, have invented new and useful Improvements in Door and Brake Control Devices, of which the following is a specification.

This invention relates to apparatus for controlling the brakes and car doors of electric railway cars, more particularly as applied to cars equipped with safety car control apparatus.

The principal object of my invention is to provide improved means by which the conductor may control certain car doors and apply the brakes, if the brakes are not already applied by the motorman.

In the accompanying drawing, the single figure is a diagrammatic view, largely in section, of a brake and car door controlling apparatus embodying my invention.

As shown in the drawing, the equipment may comprise a motorman's brake valve device 1, at each end of the car, if the car is of the double end type, an emergency valve device 2, a main reservoir 3, a brake cylinder 4, and door engines 5 and 6 for respectively controlling the center car doors at opposite sides of the car.

Manually operated valve devices 7 and 8 are provided for controlling each door engine and relay valve device 9 is employed for effecting an application of the brakes when the conductor operates one of the valve devices 7 and 8 to operate the car doors. The emergency valve device 2 may comprise a casing having a piston chamber 10 connected to the emergency brake pipe 11 and containing piston 12 and having a valve chamber 13, connected to main reservoir 3 and containing a slide valve 14, adapted to be operated by piston 12.

The relay valve device 9 may comprise a casing containing a movable diaphragm 15 having the chamber 16 at one side connected to a double check valve device 17. The diaphragm 15 carries a stem 18 for operating a valve 19 which is adapted to control communication from the main reservoir 3 through a double check valve device 20 to the brake cylinder 4.

Each conductor's brake and door controlling valve device 7 and 8 may comprise a casing having a valve chamber 21 connected to the emergency brake pipe 11 and containing a rotary slide valve 22 adapted to be operated by a removable handle 23. The door engines 5 and 6 may be of the well known construction having connected pistons 24 and 25, the piston chamber of piston 24 being connected by pipe 26 to the seat of the rotary valve 22 and the piston chamber of piston 25 to pipe 27, leading to the seat of the rotary valve 22. The pipe 26 of the door engine 5 is also connected to one side of the double check valve 28 of the double check valve device 17 and pipe 26 of the door engine 6 to the other side of the check valve 28.

In operation, fluid under pressure from the main reservoir 3 is supplied to valve chamber 13 and flows through feed groove 29 past piston 12 to piston chamber 10 and the emergency brake pipe 11 and with the fluid pressures equalized on opposite sides of the piston 12, the spring 30 maintains the piston and slide valve 14 in the positions shown in the drawing.

Assuming that the removable handle 23 is applied to the valve device 7 for operating the door engine 5, the other valve device 8 will be left in the position shown, with pipe 26 connected by cavity 31 with an exhaust port 32 and with pipe 27 connected by port 33 with valve chamber 21. Fluid under pressure is therefore supplied to piston 25 while piston 24 is vented to the atmosphere, and the door engine will be shifted to the position for holding the corresponding car door closed.

If the motorman wishes to effect an application of the brakes, the brake valve device 1 at the operating end of the car is operated so as to supply fluid under pressure from the emergency brake pipe 11 to the straight air pipe 34 and thence fluid flows through cavity 35 in the emergency slide valve 14 to pipe 36, leading to one side of the double check valve 37 of the double check valve device 20. If both of the conductor's valves 7 and 8 are in the door closing positions, as shown in the drawing, the chamber 16 of the diaphragm 15 will be connected to the atmosphere, regardless of the position of the double check valve 28, so that the valve 19 will be held seated by the spring 38 and main reservoir pressure acting on the valve.

The adjacent side of the double check valve 37 is then connected to the atmosphere through exhaust ports 39 and fluid under pressure supplied to pipe 36 operates to shift the double check valve 37 to the position shown in the drawing, so that fluid under pressure is supplied to the brake cylinder 4.

If the conductor wishes to open the center car door at the operating side of the car, he manipulates the handle 23 so that the rotary valve 22 is shifted to a position in which the pipe 27 is connected to the atmosphere and fluid under pressure is supplied to pipe 26. The pistons 24 and 25 are then shifted to the position for opening the car door and at the same time, fluid supplied to pipe 26 flows to the double check valve 28 and shifts same, so that fluid is supplied from pipe 26 to diaphragm chamber 16.

The diaphragm 15 is thereupon operated to unseat the valve 19 and permit the flow of fluid from the main reservoir 3 to the double check valve 37 and if the brakes have not already been applied by the motorman, the double check valve 37 will be shifted to the left, so as to establish direct communication from the main reservoir to the brake cylinder. It will thus be seen that the conductor cannot open a car door without also applying the brakes, unless the brakes have already been applied.

If the center door on the opposite side of the car is to be operated and controlled by the conductor, the handle 23 is removed from the valve device 7 and is applied to the valve device 8. In this case the operation will be the same as hereinbefore described, except that the other center door is controlled. The check valve 28 prevents loss of pressure through the exhaust port of the inactive conductor's controlling valve when the other valve is being operated, while the check valve 37 prevents loss of pressure through the brake valve device 1 when fluid is supplied to the brake cylinder by operation of one of the conductor's controlling valves.

Having now described my invention, what I claim as new and desire to secure by Letters Patent, is:—

1. The combination with a motorman's brake valve device for effecting an application of the brakes, of a fluid pressure operated door engine, a manually operated valve device for supplying fluid to said door engine, a main reservoir charged with fluid under pressure, and a valve device operated by fluid supplied to the door engine for supplying fluid directly from said main reservoir to effect an application of the brakes.

2. The combination with a brake cylinder and a motorman's brake valve device for supplying fluid under pressure to the brake cylinder, of a fluid pressure operated door engine, a valve device manually operable by the conductor for supplying fluid to said door engine, a source of fluid under pressure, and a valve device operated by fluid supplied to the door engine for supplying fluid from said source to the brake cylinder.

3. The combination with a brake cylinder and a motorman's brake valve device for supplying fluid under pressure to the brake cylinder, of a fluid pressure operated door engine, a valve device manually operable by the conductor for supplying fluid to said door engine, a source of fluid under pressure, a valve device operated by fluid supplied to the door engine for supplying fluid from said source to the brake cylinder, and a double check valve for controlling communication from said last mentioned valve device and from the motorman's brake valve to the brake cylinder.

4. The combination with two car door controlling engines and means for supplying fluid under pressure to said engines, of valve mechanism operated upon supplying fluid to either engine for effecting an application of the brakes.

5. The combination with two fluid pressure operated car door engines and a manually operated valve for supplying fluid to each engine, of valve mechanism operated by fluid under pressure supplied to either engine for effecting an application of the brakes and means for controlling communication from either door engine through which fluid is supplied to said valve mechanism.

6. The combination with two fluid pressure operated car door engines and a manually operated valve for supplying fluid to each engine, of valve mechanism operated by fluid under pressure supplied to either engine for effecting an application of the brakes and a double check valve operated by fluid supplied to one door engine for cutting off communication through which fluid is supplied from the other door engine to said valve mechanism.

7. The combination with two door engines, each operable by fluid under pressure for opening a corresponding car door, of means operated upon supplying fluid to a door engine for opening a car door for effecting an application of the brakes.

8. The combination with two door engines, each operable by fluid under pressure for opening a corresponding car door, of means operated upon supplying fluid to one door engine for effecting an application of the brakes and a double check valve operated by the flow of fluid from said door engine for cutting off communication from the other door engine to said means.

In testimony whereof I have hereunto set my hand.

ELLERY R. FITCH.